May 15, 1934.  L. H. STEIN  1,958,725

BALL BEARING

Filed Aug. 14, 1933

Inventor:
Louis H. Stein
By Williams, Bradbury, McCaleb & Hinkle
Attys.

Patented May 15, 1934

1,958,725

UNITED STATES PATENT OFFICE 1,958,725

BALL BEARING

Louis H. Stein, Chicago, Ill., assignor to Aetna Ball Bearing Manufacturing Company, Chicago, Ill., a corporation of Illinois Application August 14, 1933, Serial No. 685,013

5 Claims. (Cl. 308—233)

My invention relates to ball bearings and more particularly thrust bearings, especially those arranged with a horizontal axis. In the drawing accompanying this specification I have indicated the bearing of my invention as applied to the clutch release bearing of an automobile, because such an application is typical of devices in which my invention may be embodied, but my invention is not to be limited to such application.

I have found that in that class of horizontal axis thrust bearings where the thrust load is repeatedly assumed and released, the bearing parts and especially the race grooves show a tendency toward premature wear not satisfactorily attributable to mere operation under load. This wear I believe to be due to the balls, together with their retaining ring, dropping down out of axial alignment with the races, so that the balls are arranged ringwise slightly eccentrically to the opposed grooves in the races, this falling down or eccentricity being due to gravity and permitted when the load is released and the race rings are permitted to separate slightly. A sudden reassumption of the thrust load initially catches the bearing balls when they are not arranged in exact concentricity with the race grooves. The result is that they are snapped into proper concentricity under the pressure of the load. The excessive wear develops I believe both from the dragging of the weight of the balls on the retainer ring on the lower surface of the top arc of the races and the bottom surfaces of the bottom arc of the races while the bearing is operating without thrust load, and also to the impact or snap just described occurring at a time when the balls are not in proper alignment.

The excessive wear in the specific regions as just described results in a general excessive wear of the bearing because the bearing as a whole no longer receives the uniform distribution of wearing surface originally provided. To the extent that any surfaces of the races are prematurely worn away, as above described, remaining surfaces will also wear away prematurely because the uniformity of the wear surfaces has been lost.

The chief object of my invention is the elimination of the foregoing objections, and in general I accomplish this by providing interengaging surfaces between the ball retainer and the race rings whereby the retainer, and consequently the balls, are always maintained in accurate concentric alignment with the grooves in the race rings, whether the bearing be under thrust load or relieved of thrust load and the races permitted to move apart slightly.

The foregoing together with further objects, features and advantages of my invention are set forth in the following description of the specific embodiment thereof and illustrated in the accompanying drawing wherein.

Figure 1:
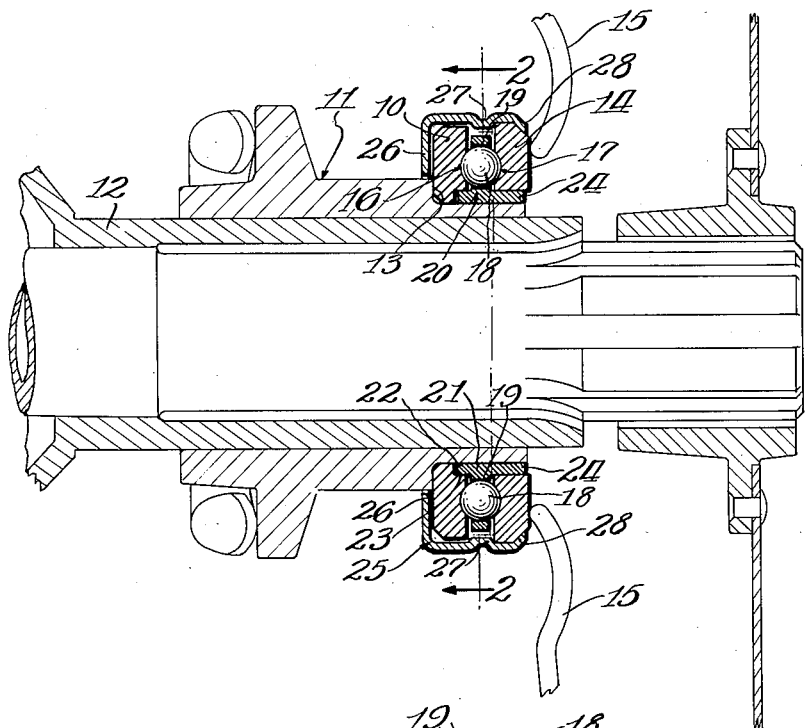
Figure 1 is a vertical longitudinal cross section of a typical automobile clutch release bearing modified to embody my invention.
Figure 2:
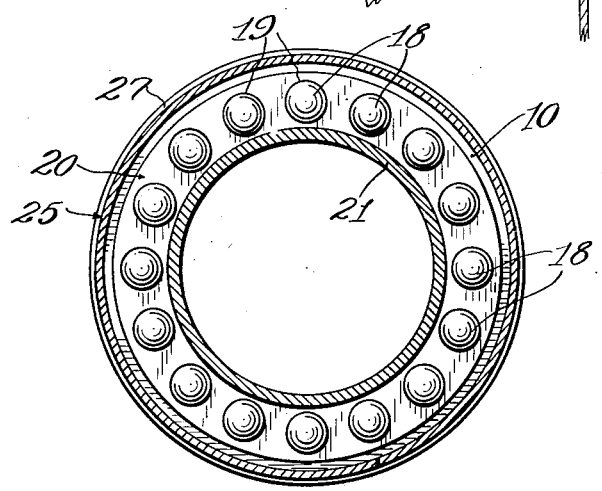
Fig. 2 is a transverse section thereof taken on the line 2—2 of Fig. 1.

In the automobile clutch release, which I have shown in the drawing as being typical of the application of my improved thrust bearing, the fixed race ring 10 is a drive fit on a sliding or floating hub 11, reciprocally mounted on the stationary tubular support 12, the race ring 10 abutting a shoulder 13 on the sliding hub 11. The sliding hub, it will be understood, is reciprocated by the conventional clutch pedal.

The free race ring 14 is contacted by a plurality of radially arranged clutch release levers or fingers 15. The race rings 10 and 14 have the conventional ball race grooves 16 and 17 respectively. The arcuately arranged balls 18 are disposed in transverse holes 19 in the ball retainer ring 20. The retainer ring 20 carries a hub portion 21 which has a running fit on the shaft—the shaft in this instance being the hub 11. One end of the hub 21 extends as an annular flange into the counterbore 23 in the fixed race ring 10, the counterbore and the flange 22 providing a running fit. The opposite side of the hub extends as a wider annular flange 24 which has a running fit with the bore of the free race ring 14.

Thus of the three rings 10, 14 and 20, only the fixed race ring 10 has a drive fit on the shaft, and the other rings have a running fit relative to each other and to the shaft. The running fit allowed between the hub of the retainer ring and the race rings is so slight a clearance that the balls are preserved in concentric alignment with the grooves of the race rings whether the bearing being under thrust load or relieved of it.

I prefer to preassemble the respective members of the bearing into a unit by employing a sheet metal jacket or shell 25 embracing the two race rings. Preferably the jacket has a deep flange 26 loosely embracing the fixed race ring 10 and fixedly embracing the free race ring 14. The latter may be conveniently effected by spinning into the jacket the intermediate annular rib 27 and an outer shallow flange 28.

Because of the continual slight wear of the retainer against the race rings and the shaft, I prefer to form the retainer ring of a self lubricating metal. A phosphor high lead content bronze or an oil impregnated porous alloy such as manufactured by the Amplex Manufacturing Company of Detroit, Michigan, under the trademark Oilite are satisfactory materials. In the specific form shown I have made the ball openings 17 as straight drilled holes and rely upon the assembly of the ball bearing unit by the shell 25 to hold the balls in position, rather than having them non-detachable from the retainer ring. They may also be counterbored alternately from opposite sides to trap the balls.

When the clutch is engaged, and the clutch release bearing is under no thrust load, the race rings are permitted to move apart as determined by the clearance between the race ring 10 and the shell 25, but, except for the negligible clearance—say, .0025 in. on the diameter—allowed for the running fits, the retainer ring with its hub prevents the balls from dropping down from concentric alignment with the race ring grooves upon the slight spreading apart of the race rings. Consequently the balls, when idle, do not wear the under sides of the grooves more than the upper sides, and when the thrust load is suddenly assumed, there is no radial movement of any of the balls snapping into alignment, for they are always retained in proper alignment.

The bore of the hub portion 21 of the retainer ring provides an extended surface for contact with the shaft and, as it is of a material having less friction against the shaft than the steel of the race rings, there is less wear on the shaft than where the free race ring rides in contact upon the shaft tending to form a groove therein.

While I disclose this specific embodiment and application of my invention, I contemplate that changes may be made therein without departing from the scope or spirit of my invention.

I claim:

1. A thrust bearing comprising a shaft, a first race ring tight on the shaft, a free race ring at the side of the first race ring, race grooves in the opposed faces of the race rings, an annular row of balls working in the grooves and between the race rings and a retainer ring for the balls restraining them from inward and outward radial movement, a flange on the retainer ring journaled against radial displacement, with a running fit, on the shaft and on one of the race rings.

2. A thrust bearing comprising a shaft, a first race ring tight on the shaft, a free race ring at the side of the first race ring, race grooves in the opposed faces of the race rings, an annular row of balls working in the grooves and between the race rings and a retainer ring for the balls, the retainer ring being T-shaped in radial cross section with the stem of the T extending outwardly and embracing the balls and the cross of the T constituting a hub journaled on the shaft, the ends of the cross extending between the shaft and the respective race rings to journal the race rings relative to the retainer ring with a running fit.

3. A thrust bearing comprising a shaft, a first race ring tight on the shaft, a free race ring at the side of the first race ring, race grooves in the opposed faces of the race rings, an annular row of balls working in the grooves and between the race rings and a retainer ring for the balls restraining them from inward and outward radial movement, a flange on the retainer ring journaled against radial displacement, with a running fit, on both race rings and on the shaft, the retainer ring being formed of a self-lubricating oil impregnated porous metal alloy.

4. A thrust bearing comprising a shaft, a fixed race ring having a driving fit on the shaft and having a counterbore at the shaft opening, a free race ring surrounding the shaft at a spaced distance from the fixed race ring, race grooves on the opposed faces of the race rings, an annular row of balls between the race rings and working in the grooves, and a retainer ring embracing the balls and extending between the race rings, the retainer ring having a hub portion extending between the shaft and the free race ring with the free race ring mounted on the hub with a running fit, the hub also extending into said counterbore and journaled on the fixed race ring with a running fit.

5. A thrust bearing comprising a shaft, a pair of race rings arranged side by side on said shaft, race grooves on the opposed faces of the race rings, an annular row of balls working in the grooves, a retainer ring for the balls extending between the race rings, and a flange on said retainer ring journaled against radial displacement, with a running fit, directly on both race rings.

LOUIS H. STEIN.